United States Patent
Watanabe et al.

(10) Patent No.: US 12,231,607 B2
(45) Date of Patent: Feb. 18, 2025

(54) IMAGE PROCESSING APPARATUS FOR PERFORMING GRADATION CORRECTION, IMAGE FORMING SYSTEM, IMAGE PROCESSING METHOD, AND STORAGE MEDIUM

(71) Applicants: Akiho Watanabe, Kanagawa (JP); Hiroyoshi Ishizaki, Kanagawa (JP); Kazuki Yoshida, Kanagawa (JP); Kengo Yamamoto, Kanagawa (JP)

(72) Inventors: Akiho Watanabe, Kanagawa (JP); Hiroyoshi Ishizaki, Kanagawa (JP); Kazuki Yoshida, Kanagawa (JP); Kengo Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/253,064

(22) PCT Filed: Dec. 2, 2021

(86) PCT No.: PCT/IB2021/061202
§ 371 (c)(1),
(2) Date: May 16, 2023

(87) PCT Pub. No.: WO2022/157570
PCT Pub. Date: Jul. 28, 2022

(65) Prior Publication Data
US 2024/0022677 A1    Jan. 18, 2024

(30) Foreign Application Priority Data
Jan. 22, 2021   (JP) .................................. 2021-008701

(51) Int. Cl.
*H04N 1/60*   (2006.01)
*G06F 3/12*   (2006.01)
(Continued)

(52) U.S. Cl.
CPC ......... *H04N 1/6027* (2013.01); *G06F 3/1208* (2013.01); *G06F 3/1256* (2013.01);
(Continued)

(58) Field of Classification Search
CPC ....... H04N 1/6027; G06T 7/0002; G06T 7/90; G06T 2207/30168; G06F 3/1208; G06F 3/1256
(Continued)

(56) References Cited

U.S. PATENT DOCUMENTS

2008/0127846 A1   6/2008  Nagai
2009/0103121 A1   4/2009  Horita et al.
(Continued)

FOREIGN PATENT DOCUMENTS

EP    3528488 A1     8/2019
JP    H09-233350 A   9/1997
(Continued)

OTHER PUBLICATIONS

International Search Report and Written Opinion issued on Mar. 10, 2022 in PCT/IB2021/061202 filed on Feb. 12, 2021.
(Continued)

*Primary Examiner* — Jamares Q Washington
(74) *Attorney, Agent, or Firm* — Harness, Dickey & Pierce, P.L.C.

(57) ABSTRACT

An image processing apparatus includes a color stabilization processing unit and a display control unit. The color stabilization processing unit is configured to determine a correction amount of gradation of image data to be printed, based on a read image obtained by reading a recording medium as a print processing result. The display control unit is configured to display information indicating the correction amount.

20 Claims, 19 Drawing Sheets

(51) Int. Cl.
*G06T 7/00* (2017.01)
*G06T 7/90* (2017.01)

(52) U.S. Cl.
CPC .............. *G06T 7/0002* (2013.01); *G06T 7/90* (2017.01); *G06T 2207/30168* (2013.01)

(58) Field of Classification Search
USPC .................................. 358/1.9, 518, 519, 521
See application file for complete search history.

(56) References Cited

U.S. PATENT DOCUMENTS

| | | | |
|---|---|---|---|
| 2010/0110512 A1 | 5/2010 | Jeon et al. | |
| 2013/0265610 A1* | 10/2013 | Noda | G06F 3/1257 358/3.01 |
| 2014/0104658 A1* | 4/2014 | Ishizuka | G03G 15/5058 358/1.13 |
| 2014/0240340 A1 | 8/2014 | Shirasawa | |
| 2015/0221077 A1* | 8/2015 | Kawabata | G06T 7/337 382/141 |
| 2019/0268502 A1 | 8/2019 | Shirasawa | |
| 2021/0247714 A1 | 8/2021 | Watanabe | |

FOREIGN PATENT DOCUMENTS

| | | |
|---|---|---|
| JP | H10-020603 A | 1/1998 |
| JP | 2008-114466 A | 5/2008 |
| JP | 2009-119860 A | 6/2009 |
| JP | 2010-283675 | 12/2010 |
| JP | 2016-019143 | 2/2016 |
| JP | 2019-142221 | 8/2019 |
| JP | 2021-125144 | 8/2021 |

OTHER PUBLICATIONS

JP Office Action for corresponding Japanese Patent Application No. 2021-008701 issued on Jul. 30, 2024.

* cited by examiner

IMAGE PROCESSING APPARATUS FOR PERFORMING GRADATION CORRECTION, IMAGE FORMING SYSTEM, IMAGE PROCESSING METHOD, AND STORAGE MEDIUM

CROSS-REFERENCE TO RELATED APPLICATIONS

This application is a national phase under 35 U.S.C. § 371 of PCT International Application No. PCT/IB2021/061202 which has an International filing date of Dec. 2, 2021, which claims priority to Japanese Application No. 2021-008701, filed Jan. 22, 2021, the entire contents of each of which are hereby incorporated by reference.

TECHNICAL FIELD

Embodiments of the present disclosure relate to an image processing apparatus, an image forming system, an image processing method, and a storage medium.

BACKGROUND ART

Various technologies have been developed that performs a gradation correction process to correct gradation of colors used for printing in an image forming apparatus. For example, a technology is known that performs color stabilization processing to determine an amount of correction in the gradation correction process for image data to be printed. The amount of correction in the gradation correction process is determined by reading a material printed by an image forming apparatus with a sensor and comparing a read color with a target color. Japanese Unexamined Patent Application Publication No. 2016-019143 discloses such a technology that performs color stabilization processing and displays information indicating a color difference between reference chromaticity data and read color information.

CITATION LIST

Patent Literature

[PTL 1]
Japanese Unexamined Patent Application Publication No. 2016-019143

SUMMARY OF INVENTION

Technical Problem

However, a correction amount of the gradation of image data is not displayed in color stabilization processing. When the correction amount of the gradation of image data is not displayed even if the information indicating a color difference is displayed, the user cannot grasp how the color stabilization processing acts on the generated color difference. For example, when a user can select whether to enable a color stabilization function, it is difficult to determine whether to enable a color stabilization function.

An object of the present disclosure is to display the correction amount of the gradation of image data in color stabilization processing.

Solution to Problem

According to an embodiment of the present disclosure, an image processing apparatus includes a color stabilization processing unit and a display control unit. The color stabilization processing unit is configured to determine a correction amount of gradation of image data to be printed, based on a read image obtained by reading a recording medium as a print processing result. The display control unit is configured to display information indicating the correction amount.

Advantageous Effects of Invention

According to the present disclosure, the correction amount of the gradation of image data in color stabilization processing is displayed.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
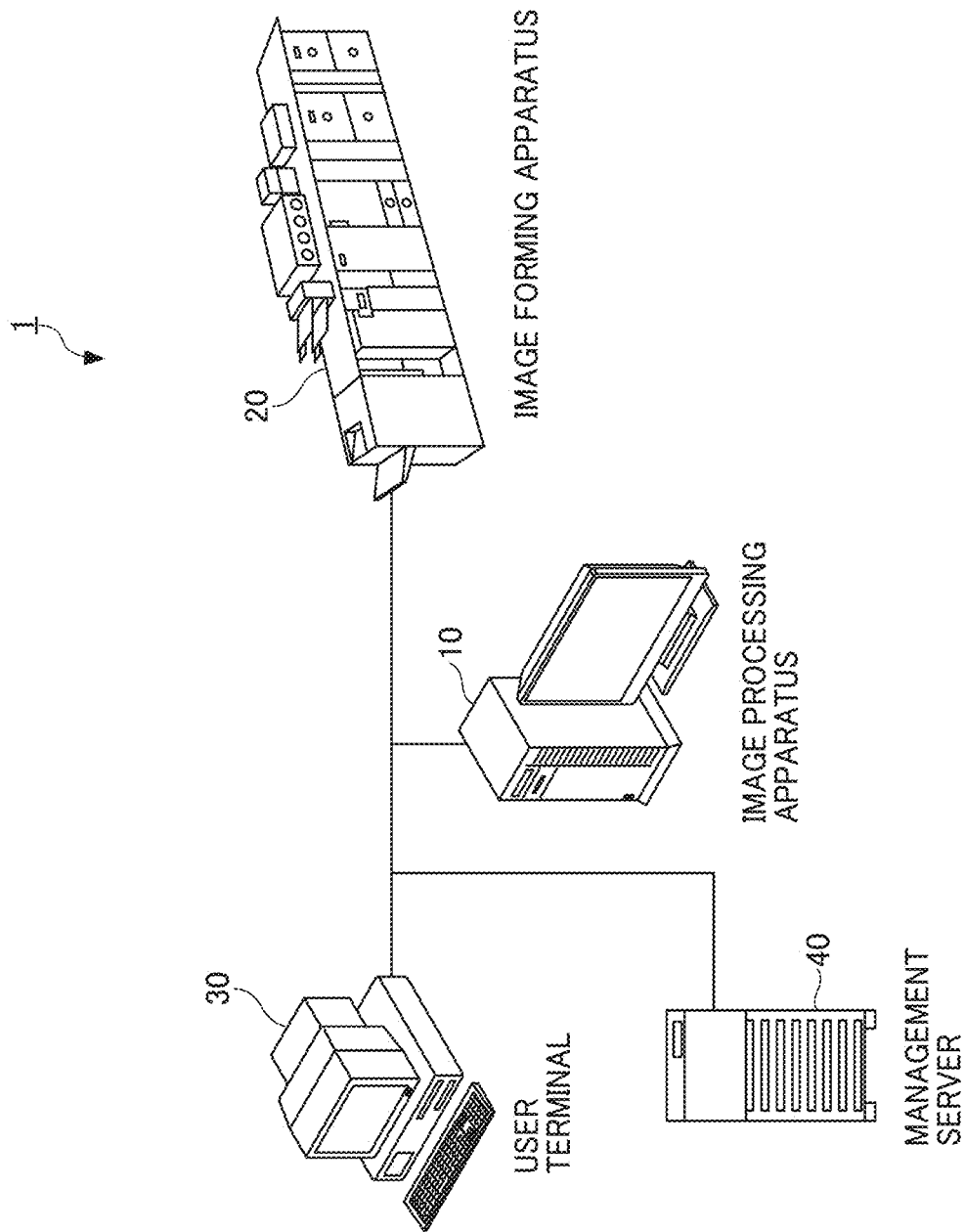
FIG. 1 is a diagram illustrating an overall configuration of an image forming system.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Hereinafter, descriptions are given of an image forming system according to a first embodiment of the present invention, with reference to drawings.

FIG. 1 is a diagram illustrating an overall configuration of the image forming system.

An image forming system 1 includes an image processing apparatus 10, an image forming apparatus 20, a user terminal 30, and a management server 40.

The image processing apparatus 10 is an apparatus that controls the image forming apparatus for example, a digital front end (DFE). The image processing apparatus 10 is communicably connected to the image forming apparatus 20, the user terminal 30, and the management server 40.

When the image processing apparatus 10 receives print job data with a signal that instructs to print an image from the user terminal 30 or the management server 40, the image processing apparatus 10 converts the print job data into image data in a format that is processed by the image forming apparatus 20, using a raster image processor (RIP) engine included in the image processing apparatus 10. Then, the image processing apparatus 10 transmits the converted image data to the image forming apparatus 20.

The image forming apparatus 20 is an apparatus that forms an image, and is, for example, a color production printer, a laser printer, or an inkjet printer. The image forming apparatus 20 receives image data from the image processing apparatus 10 and prints an image on a sheet based on the received image data. Note that the sheet is an example of a recording medium on which an image is formed.

The user terminal 30 is a terminal that receives an operation from a user and instructs to print an image. Specifically, the user terminal 30 transmits print job data including image data to the image processing apparatus 10 or the management server 40. The user terminal 30 transmits information indicating a threshold in color stabilization processing to the image processing apparatus 10 in response to an operation of the user. In addition, the user terminal receives display control by the image processing apparatus 10 and displays a screen indicating an execution status of the color stabilization processing.

The management server 40 adds the print job data as a queue to a storage device that stores the print job data waiting for printing in response to the receipt of the print job data from the user terminal 30. The management server 40 extracts print job data from the queue in the order in which the print job data is added to the queue or in accordance with a priority set appropriately. Then, the management server 40 transmits the print job data to the image processing apparatus 10.

Figure 2:
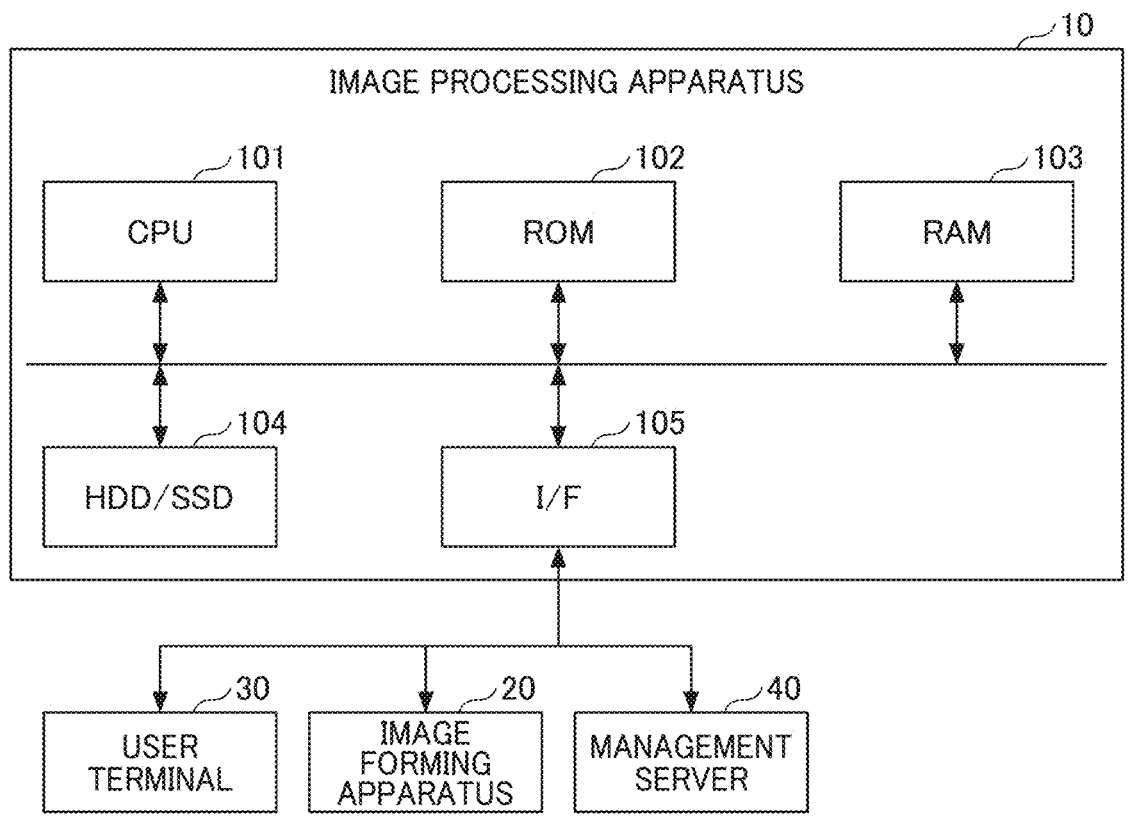
FIG. 2 is a diagram illustrating a hardware configuration of an image processing apparatus.

FIG. 2 is a diagram illustrating a hardware configuration of an image processing apparatus.

The image processing apparatus 10 is constructed by a computer and includes a central processing unit (CPU) 101, a read only memory (ROM) 102, a random access memory (RAM) 103, a hard disk drive (HDD)/solid state drive (SSD) 104, and an interface (UF) 105, which are connected with each other via a bus.

The CPU 101 reads a program stored in the ROM 102 or the HDD/SSD 104 and stores the program in the RAM 103. Then, the CPU 101 executes various processes in accordance with the program stored in the RAM 103. The processes are described below.

The ROM 102 is a non-volatility auxiliary storage device. The ROM 102 stores programs such as a basic input/output system (BIOS) that is programed basic operations of the image processing apparatus 10.

The RAM 103 is a volatile main storage device. The RAM 103 is used as a working area of the CPU 101.

The HDD/SSD 104 is a large capacity non-volatility auxiliary storage device. The HDD/SSD 104 stores received image data, programs for various processes, and setting information. The various processes are described below.

The I/F 105 includes a local area network (LAN) card and is a relay device when the image processing apparatus 10 communicates with the image forming apparatus 20, the user terminal 30, or the management server 40.

Figure 3:
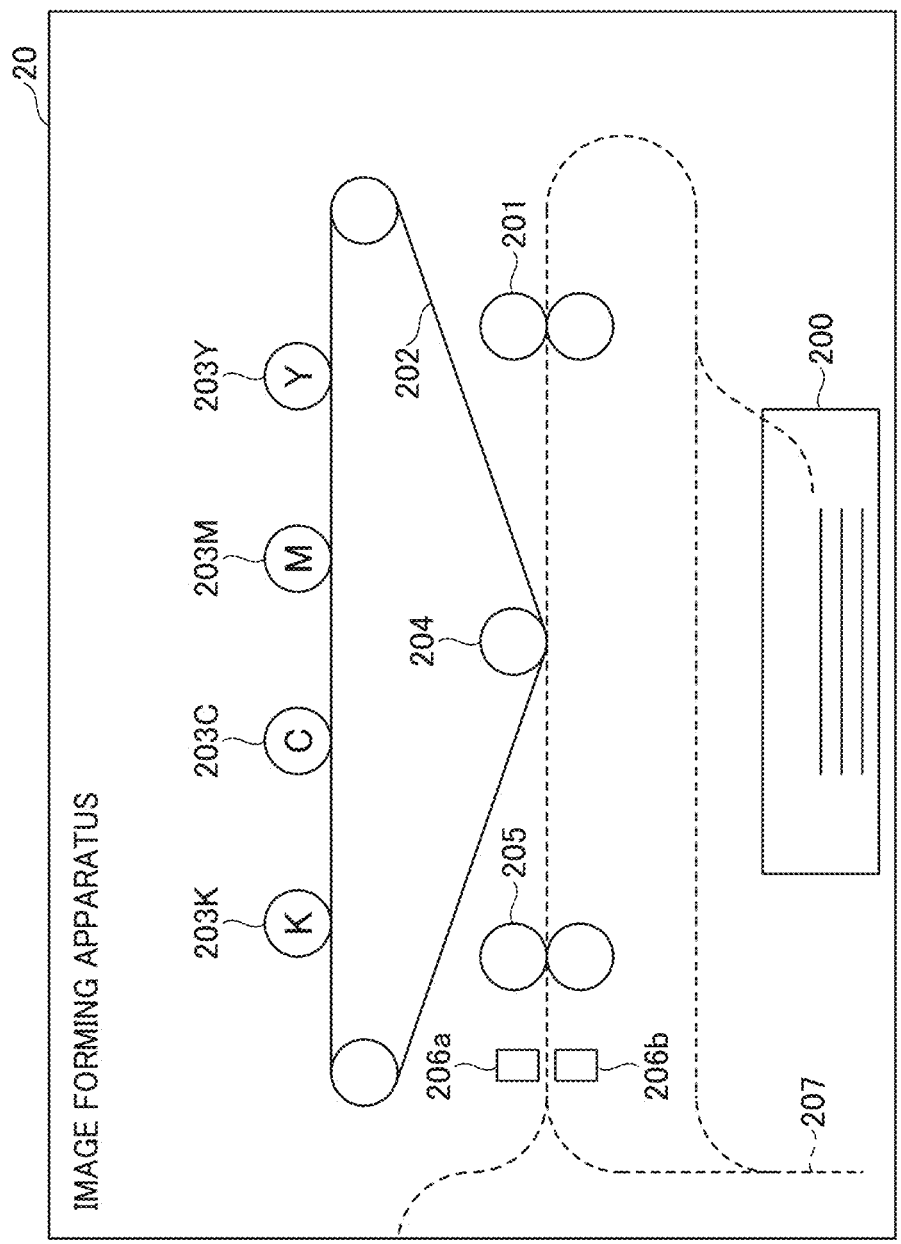
FIG. 3 is a diagram illustrating an internal structure of an image forming apparatus.

FIG. 3 is a diagram illustrating an internal structure of an image forming apparatus.

The image forming apparatus 20 has a configuration in which photoconductor drums 203Y, 203M, 203C, and 203K are disposed along an intermediate transfer belt 202. The photoconductor drums 203Y, 203M, 203C, and 203K form yellow (Y), magenta (M), cyan (C), and black (K) toner images, respectively. The intermediate transfer belt 202 is a moving unit of an endless loop. Images of the respective colors are developed with toner on the respective surfaces of the photoconductor drums 203Y, 203M, 203C, and 203K and are transferred and superimposed one after another onto the surface of the intermediate transfer belt 202 to form a full-color image.

The full-color image borne on the intermediate transfer belt 202 is transferred onto the sheet by a transfer roller 204. The sheet is fed from a sheet feeding tray 200 and conveyed by a conveyance roller 201. Then, the sheet is further conveyed, and the toner is fixed to the sheet by a fixing roller 205.

In the case of duplex printing, after the image is formed on the front side, the sheet is conveyed to a sheet reverse passage 207 in the sheet conveyance passage, then is reversed, and is conveyed again to the position of the transfer roller 204.

The image forming apparatus 20 further includes inline sensors 206a and 206b. The inline sensors 206a and 206b read images fixed on both sides of the sheet by the fixing roller 205 and transmit the read images to the image processing apparatus 10 via the communication device. The number of inline sensors is not limited to two and may be one or three or more as long as one side or both sides of the sheet is read while the sheet is conveyed.

Figure 4:
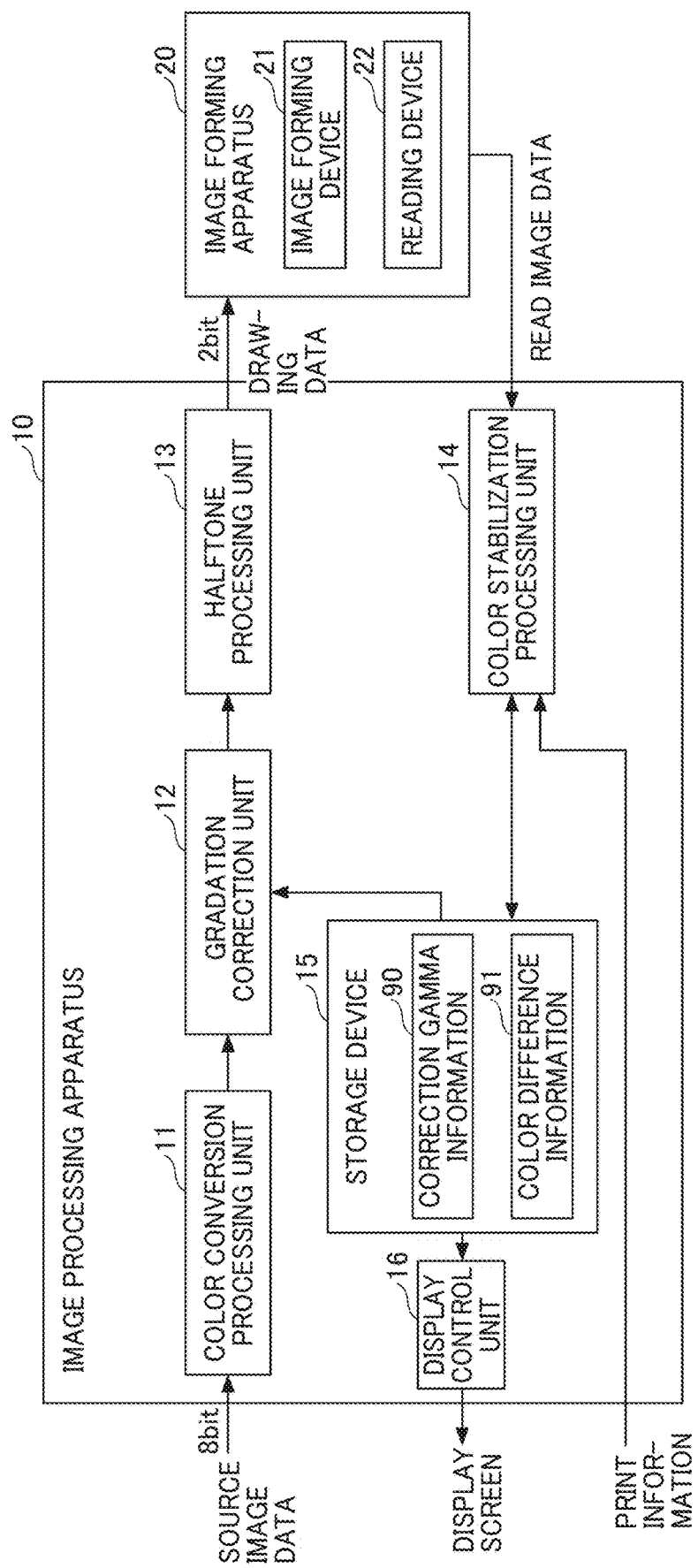
FIG. 4 is a diagram illustrating functions of an image processing apparatus according to a first embodiment.

FIG. 4 is a diagram illustrating functions of the image processing apparatus.

The image processing apparatus 10 includes a color conversion processing unit 11, a gradation correction unit 12, a halftone processing unit 13, a color stabilization processing unit 14, and a storage device 15.

The color conversion processing unit 11 performs predetermined color conversion processing on the CMYK values or the RGB values of the input image data using a RIP engine and converts the CMYK values or the RGB values into image data in a CMYK format suitable for the image forming apparatus 20.

The gradation correction unit 12 corrects the gradation of the image data converted by the color conversion processing unit 11 based on a correction gamma information 90. When the setting value of a color stabilization function is "OFF", the gradation correction unit 12 uses the preset correction gamma information 90. The preset correction gamma information 90 may be linear data, in which case the image data is substantially uncorrected. Alternatively, the correction gamma information 90 may be set according to the performance of the image forming apparatus 20.

When the setting value of the color stabilization function is "ON", the gradation correction unit 12 corrects the gradation of the image data using the correction gamma information 90 generated by the color stabilization processing unit 14. The gradation correction unit 12 stores the correction result in the RAM 103 or the HDD/SSD 104.

The halftone processing unit 13 performs halftone color processing and converts the 8 bits image data corrected by the gradation correction unit 12 into 2-bit image data.

The color stabilization processing unit 14 achieves the color stabilization function. Specifically, the color stabilization processing unit 14 generates the correction gamma information 90 used for the gradation correction by the gradation correction unit 12. The correction gamma information 90 is generated based on the read image data received from the image forming apparatus 20 and the print information received from the user terminal 30 or the management server 40.

Further, the color stabilization processing unit 14 generates color difference information 91 indicating a color difference between a reference color and the print color, based on the information indicating the reference color. Specifically, the color stabilization processing unit 14 calculates the color difference based on differences in lightness, saturation, and hue between the reference color and the print color. Note that various methods are known as a method of calculating the color difference, and any method may be used.

Note that the color stabilization processing unit 14 may generate the correction gamma information 90 based on the generated color difference information 91.

The storage device 15 stores various types of information. Specifically, the storage device 15 stores the correction gamma information 90 and the color difference information 91. The display control unit 16 performs control to display information indicating the correction amount of the gradation by the color stabilization processing unit 14. Specifically, the display control unit 16 generates screen data indicating the execution status of the color stabilization process and transmits the screen data to the user terminal 30 in response to a request from the user terminal 30. Note that each of the display control unit 16 and the storage device 15 may be a server device included in the image processing apparatus 10 and may be configured by a web server that is accessible from a web browser application of the user terminal 30. The user terminal 30 displays a screen based on the received screen data. A specific example of the screen displayed by the user terminal 30 is described below.

The image forming apparatus 20 includes an image forming device 21 and a reading device 22.

The image forming device 21 prints an image on a recording medium based on drawing data received from the image processing apparatus 10. That is, the image forming device 21 is configured to form the image on the recording medium.

The reading device 22 is configured to read the recording medium on which an image is printed by the image forming device 21, generate read image data, and transmit the generated read image data to the image processing apparatus 10. The reading device 22 controls inline sensors 206*a* and 206*b* to perform these operations.

A description is given of operations of the image forming system 1, with reference to the drawings.

Figure 5:
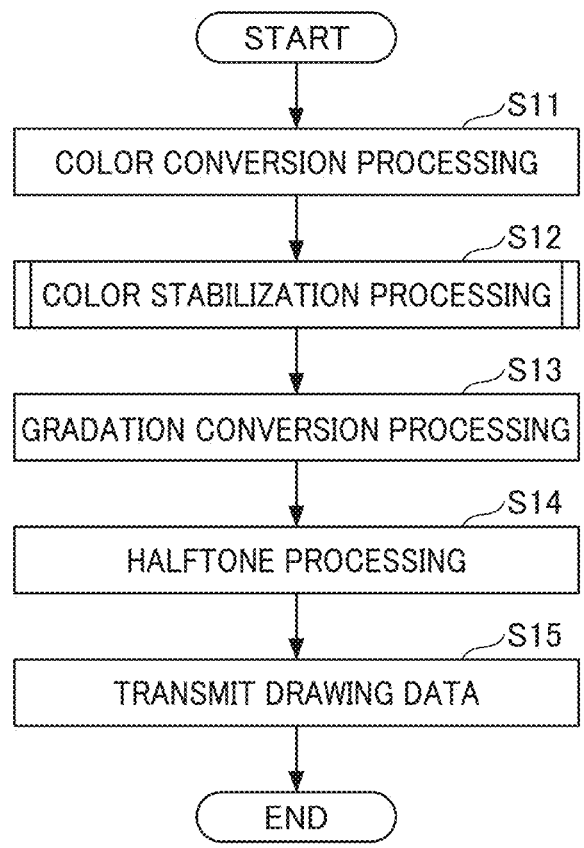
FIG. 5 is a flowchart of an example of image processing.

FIG. 5 is a flowchart of an example of image processing.

The following description is given providing that the image forming apparatus 20 executes printing and stores the read image data of the image on the printed sheet according to the process described below. Note that the print job of the read image data may be the same or different from the print job that is the target of the image processing.

For example, based on the read image data of the print results from page 1 to page 20 in a print job, the image data of page 21 and subsequent pages in the same print job may be corrected.

In step S11, when the image processing apparatus 10 receives the print job from the user terminal 30 or the management server 40, the color conversion processing unit 11 executes color conversion processing. Specifically, the color conversion processing unit 11 converts the received print job data into image data in the CMYK format suitable for the image forming apparatus 20.

In step S12, the color stabilization processing unit 14 executes color stabilization processing. Details of the color stabilization processing are described below.

In step S13, the gradation correction unit 12 executes gradation conversion processing. The gradation conversion processing is executed to correct the gradation of the image data converted by the color conversion processing unit 11 based on the correction gamma information.

In step S14, the halftone processing unit 13 executes halftone processing. The halftone processing is executed to convert 8 bits image data corrected by the gradation correction unit 12, into 2-bit drawing data to be processed by the image forming apparatus 20.

Then, in step S15, the image processing apparatus 10 executes drawing data transmission processing. The drawing data transmission processing is executed to transmit the 2-bit drawing data converted by the halftone processing unit 13 to the image forming apparatus 20.

Figure 6:
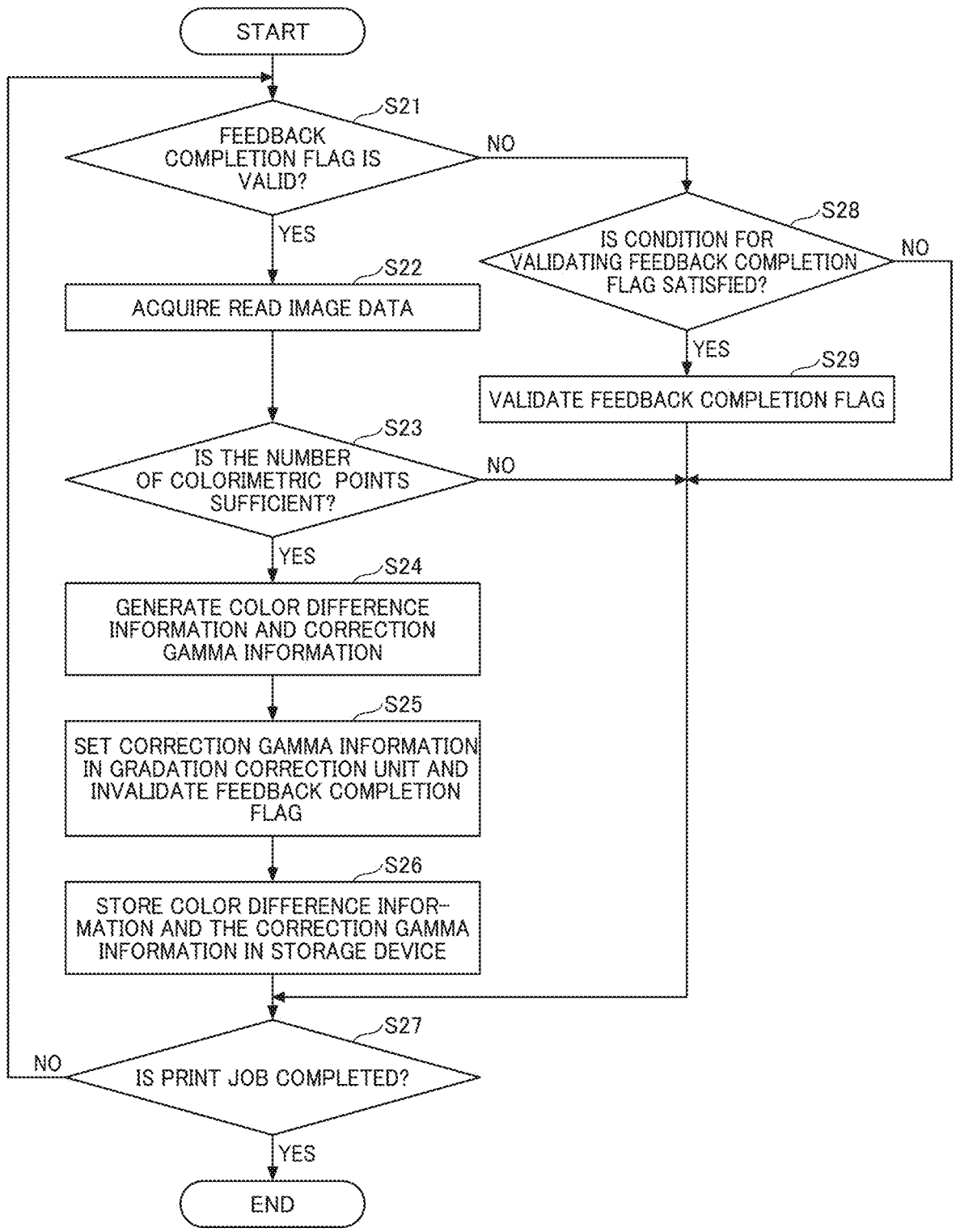
FIG. 6 is a flowchart of color stabilization processing according to the first embodiment.

FIG. 6 is a flowchart of color stabilization processing according to the first embodiment.

A description is given of the color stabilization processing in step S12 in the flowchart illustrated in FIG. 5. The color stabilization processing unit 14 executes the following processing for each page of the print job. In step S21, the color stabilization processing unit 14 determines whether a feedback completion flag is valid. The feedback completion flag is a flag indicating whether the correction gamma information 90 generated by the color stabilization processing unit 14 has been set in the gradation correction unit 12.

Specifically, the feedback completion flag is a flag indicating either valid value or invalid value. The initial value of the feedback completion flag is valid. The feedback completion flag becomes invalid when the correction gamma information 90 generated by the color stabilization processing unit 14 is set in the gradation correction unit 12. Due to such a configuration, an overcorrection is prevented. The overcorrection indicates to correct the gradation of the image data using the correction gamma information 90 based on image data before correction by the gradation correction unit 12. That is, the correction gamma information 90 for the next feedback is generated after the generated correction gamma information 90 is reflected in the printing.

In step S22, when the feedback completion flag is determined to be valid (YES in step S21), the color stabilization processing unit 14 acquires the read image data. Then, in step S23, the color stabilization processing unit 14 determines whether the number of colorimetric points in the read image is sufficient. The number of colorimetric points is image data (the number of observation points) that is observed on a surface of printed sheet. For example, the color stabilization processing unit 14 determines whether the number of measured colors is sufficient from observation points on the surfaces of approximately four sheets. The approximately four sheets used for the determination are sheets that are equal to or less than a predetermined number of sheets determined by a specified condition described below, and are sheets printed based on print image data whose gradation has been corrected by applying the correction gamma information 90. The specified condition is described below.

In step S24, when the number of colorimetric points is determined to be sufficient (YES in step S23), the color stabilization processing unit 14 generates the color difference information 91 and the correction gamma information 90.

Specifically, the color stabilization processing unit 14 generates the correction gamma information 90 for correction so as to eliminate the color difference between the reference color and the color measurement result. In addition, the color stabilization processing unit 14 generates the color difference information 91 indicating the color difference between the reference color and the color measurement result. The reference color is a color used as a reference for stabilizing the color. The reference color may be a color preset in the image processing apparatus 10 or a target color designated by the user.

The color difference information 91 is displayed on a display screen described later. For example, the color difference information 91 is time-series data in which a color difference of 50% gradation in each color of CMYK is associated with a measurement time. When the color stabilization processing unit 14 calculates the color difference of 50% gradation, the color stabilization processing unit 14 estimates the print color of 50% gradation from the color measurement result and calculates the color difference between the estimated print color and the reference color of 50% gradation. The print color used for calculating the color difference is a color based on the result of measuring the color of the printed recording medium. The print color may be an actually measured color or may be a color estimated from the color measurement result, as a color of a designated gradation such as a gradation of 50%.

Note that the color difference information 91 is not limited to the gradation 50% and may include color differences of a plurality of gradations. In this case, screen data of a display screen described later may include information indicating a color difference of a plurality of gradations.

Further, the correction gamma information 90 is information indicating the correction amount of the gradation by the gradation correction unit 12. The correction amount of the gradation is a correction amount of each color of CMYK and is associated with the color difference information 91 in order to indicate that the correction amount is calculated based on which color difference.

In step S25, the color stabilization processing unit 14 sets the generated correction gamma information 90 in the gradation correction unit 12 and invalidates the feedback completion flag. Due to such a configuration, the gradation correction unit 12 executes gradation correction based on the generated correction gamma information 90 in the gradation conversion processing in step S13 in the flowchart illustrated in FIG. 5.

Subsequently, in step S26, the color stabilization processing unit 14 stores the color difference information 91 and the correction gamma information 90 in the storage device 15. Then, in step S27, the color stabilization processing unit 14 determines whether the print job being processed is completed. When the color stabilization processing unit 14 determines that the print job has been completed (YES in step S27), the color stabilization processing unit 14 finalizes the color stabilization processing. When the color stabilization processing unit 14 determines that the print job is not completed (NO in step S27), the procedure returns to step S21.

When the feedback completion flag is determined not to be valid in step S21 (NO in step S21), the color stabilization processing unit 14 determines whether a condition for validating the feedback completion flag is satisfied in step S28.

The condition for validating the feedback completion flag is predetermined. For example, a predetermined number of sheets (for example, 20 sheets) are printed after the feedback completion flag is invalidated; a predetermined time (for example, 20 seconds) has elapsed since the feedback completion flag became invalid; or a notification that the gradation correction process has started is received from the gradation correction unit 12.

When the color stabilization processing unit 14 determines that the condition for validating the feedback completion flag is satisfied (YES in step S28), the color stabilization processing unit 14 validates the feedback completion flag in step S29. When the color stabilization processing unit 14 determines that the condition for validating the feedback completion flag is not satisfied (NO in step S28), the color stabilization processing unit 14 skips the processing of step S29.

Then, the color stabilization processing unit 14 proceeds to step S27. When the color stabilization processing unit 14 determines that the number of colorimetric points is not sufficient in step S23 (NO in step S23), the color stabilization processing unit 14 proceeds to step S27.

As described above, in the color stabilization processing, the color stabilization processing unit 14 generates the color difference information 91 indicating a color difference between the print color and the reference color and the correction gamma information 90 indicating a correction amount, based on the read image data obtained by reading sheets that are equal to or less than the predetermined number of sheets. Then, the color stabilization processing unit 14 sets the generated color difference information 91 and correction gamma information 90 in the gradation correction unit 12 to be applied to correction of gradation of image data to be printed for the next predetermined number of sheets. Then, the color stabilization processing unit 14 stores the information in the storage device 15 in a displayable format. Due to such a configuration, the display control unit 16 performs control to display the correction gamma information 90 and the color difference information 91 by executing display control processing. Details of the display control processing are described later.

Figure 7:
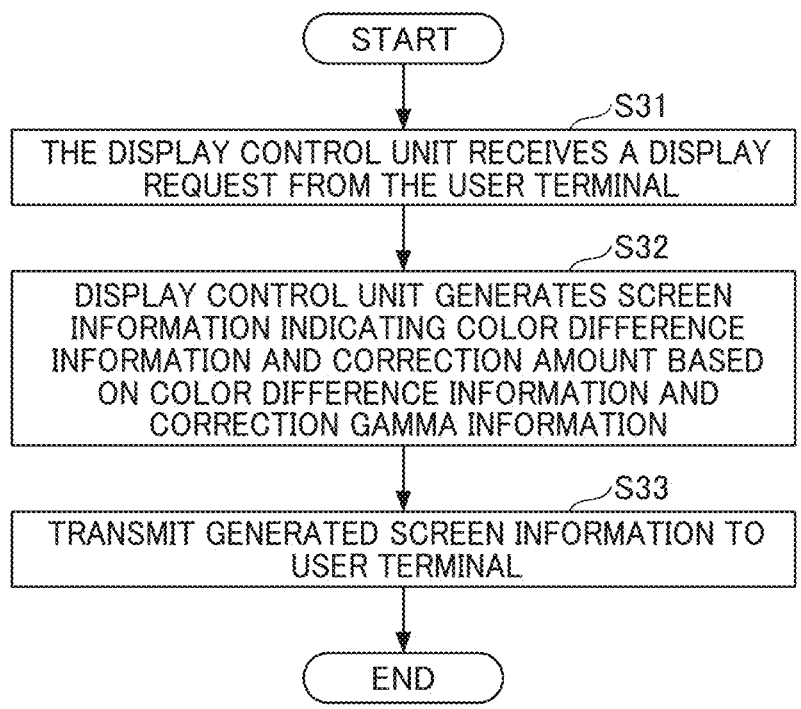
FIG. 7 is a flowchart of an example of display control processing.

FIG. 7 is a flowchart of an example of display control processing.

In step S31, the display control unit 16 receives a display request from the user terminal 30 The display request is, for example, a request by hypertext transfer protocol (HTTP) communication.

Based on the color difference information 91 and the correction gamma information 90 stored in the storage device 15, the display control unit 16 generates screen information indicating a color difference and a correction amount in step S32 and transmits the generated screen information to the user terminal 30 in step S33.

The screen data includes a graph in which color differences of 50% gradation of each color of CMYK are plotted in time series, and a display indicating the strength of the correction amount.

Figure 8:
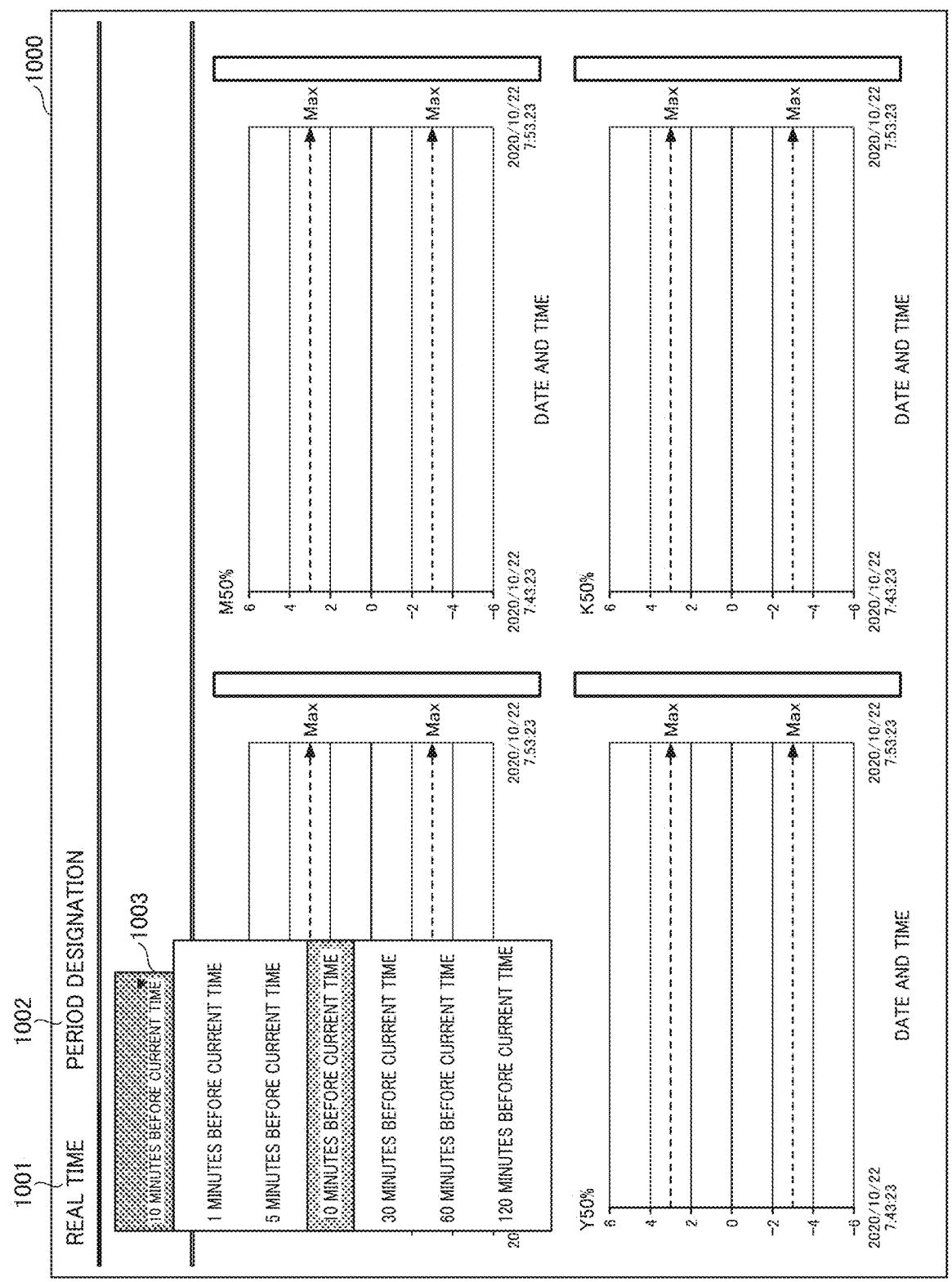
FIG. 8 is a first diagram illustrating a display screen of a color stabilization function according to the first embodiment.

FIG. 8 is a first diagram illustrating a display screen of the color stabilization function according to the first embodiment.

A color stabilization function display screen 1000 is a screen displayed on the user terminal when the color stabilization function is enabled. Specifically, the color stabilization function display screen 1000 includes a "real time" tab 1001 and a "period designation" tab 1002, each for selecting a method to designate a period to be displayed.

FIG. 8 illustrate a status in which the "real time" tab 1001 is selected. In this case, a target period selection field 1003 is displayed on the color stabilization function display screen 1000. In the target period selection field 1003, a user can select a period in minutes from the current time with respect to data to be displayed.

Figure 9:
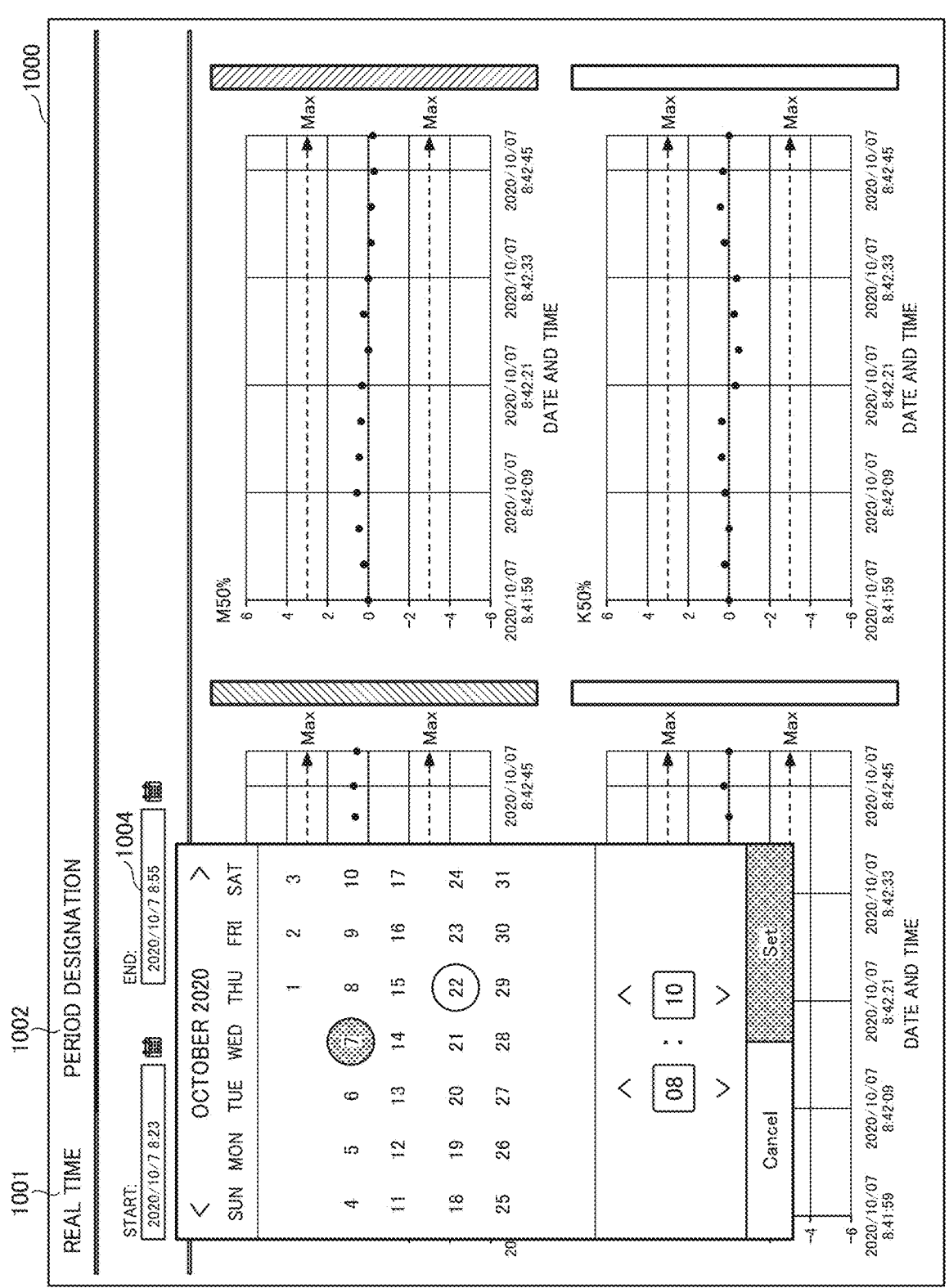
FIG. 9 is a second diagram illustrating a display screen of the color stabilization function according to the first embodiment.

FIG. 9 is a second diagram illustrating a display screen of the color stabilization function according to the first embodiment.

FIG. 9 illustrates a status in which the "period designation" tab 1002 is selected. In this case, a period designation field 1004 is displayed on the color stabilization function display screen 1000. In the period designation field 1004, the start date and time of the target period and the end date and time of the target period is selectable.

Figure 10:
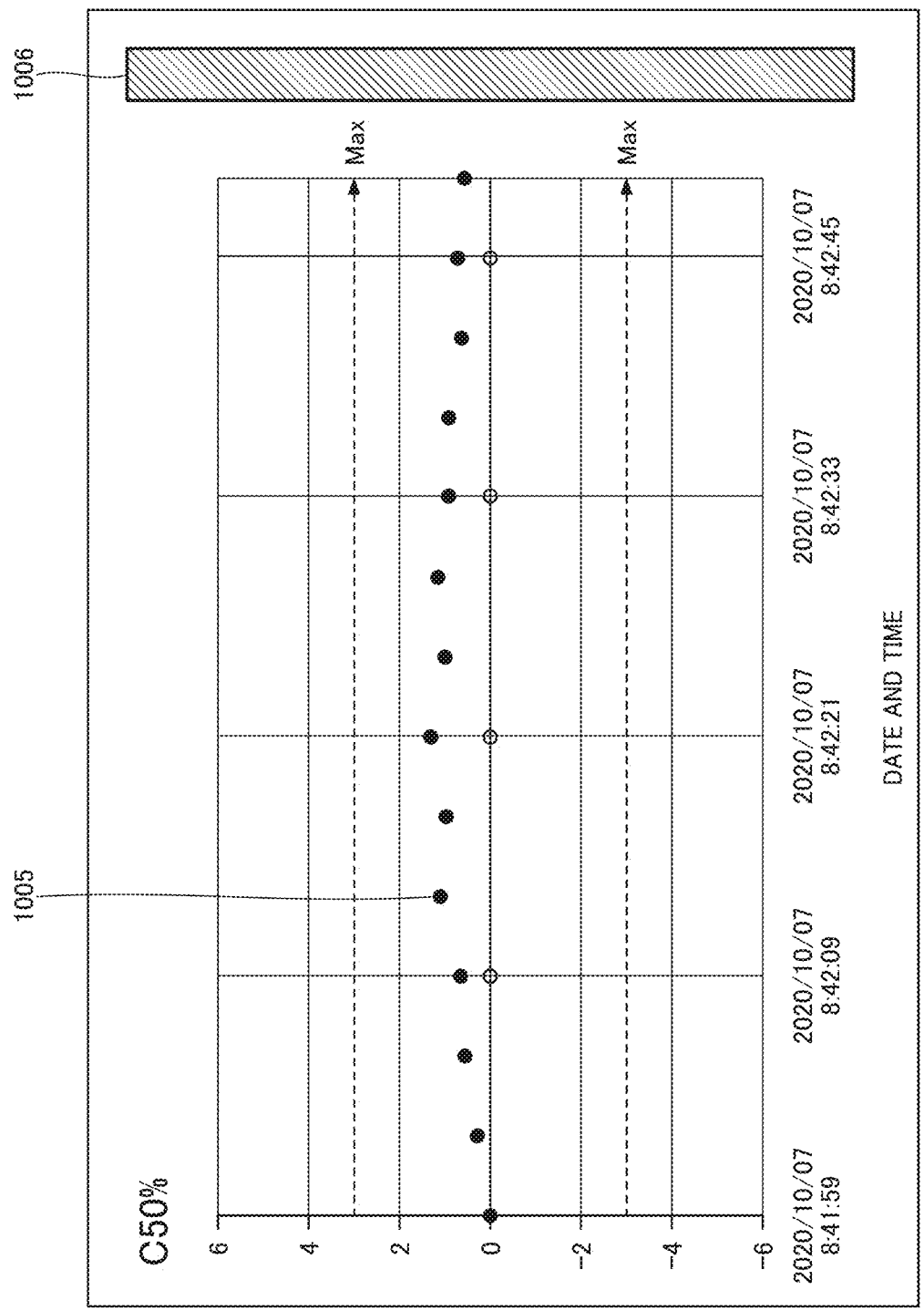
FIG. 10 is a diagram illustrating a display of color difference and correction amount.

FIG. 10 is a diagram illustrating a display of color difference and correction amount.

FIG. 10 is an enlarged view of a graph portion of C50% (50% gradation of cyan) in the color stabilization function display screen 1000. The color stabilization function display screen 1000 includes a graph of each color of M50% (50% gradation of magenta), Y50% (50% gradation of yellow), and K50% (50% gradation of black), similar to C50% in FIG. 10.

The graph portion of each color includes a plot 1005 indicating the color difference between the reference color and the print color (estimated value) in each color and a bar 1006 indicating the correction amount of each color. Note that the plot 1005 and the bar 1006 are display components that are controlled by the display control unit 16. For example, the display component and the display screen may be configured by a web page that is generated and provided by a web server included in the image processing apparatus 10. The web page may be configured by hypertext markup language (HTML), JavaScript®, or cascading style sheets (CSS).

The plot 1005 represents the color difference of the target period selected by the method illustrated in FIGS. 8 and 9 in time series. The vertical axis of the graph represents the color difference, and the horizontal axis represents the measurement time. The measurement time is a time included in the period selected in the target period selection field 1003 or the period designated in the period designation field 1004.

The bar 1006 is a display component in which the density of the displayed color changes according to the correction amount included in the generated correction gamma information That is, the bar 1006 is configured to display changes in accordance with a magnitude of a correction amount. The display component that displays the magnitude of the correction amount may be a display component whose color, shape, or pattern changes, or character (such as High or Low) indicating the magnitude changes. Further, when the "real time" tab 1001 is selected, the bar 1006 represents the correction amount included in the most recently generated correction gamma information 90. In this case, the display control unit 16 may perform control to display the correction amount before applying the correction amount to the gradation correction of the image data in response to the determination of the correction amount. Alternatively, the display control unit 16 may perform control to display the correction amount in response to application of the determined correction amount to gradation correction of the image data. In addition, for example, the bar 1006 that is a display component indicating the magnitude of the correction amount for each color material may be displayed on each graph of the plot 1005 indicating the color difference for each of a plurality of color materials of CMYK.

Further, when the "real time" tab 1001 is selected, the latest information may be constantly displayed. Specifically, for example, the user terminal 30 may periodically transmit an HTTP request (reload request) for displaying a display screen, to the image processing apparatus 10, for example, each second. Alternatively, the image processing apparatus 10 may automatically transmit the whole or a part of the screen data (for example, a graph portion of each color) to the user terminal 30 by a bidirectional communication protocol such as WebSocket.

Further, when the "period designation" tab 1002 is selected, the bar 1006 represents the correction amount associated with the color difference displayed at the last time included in the designated period.

Figure 11:
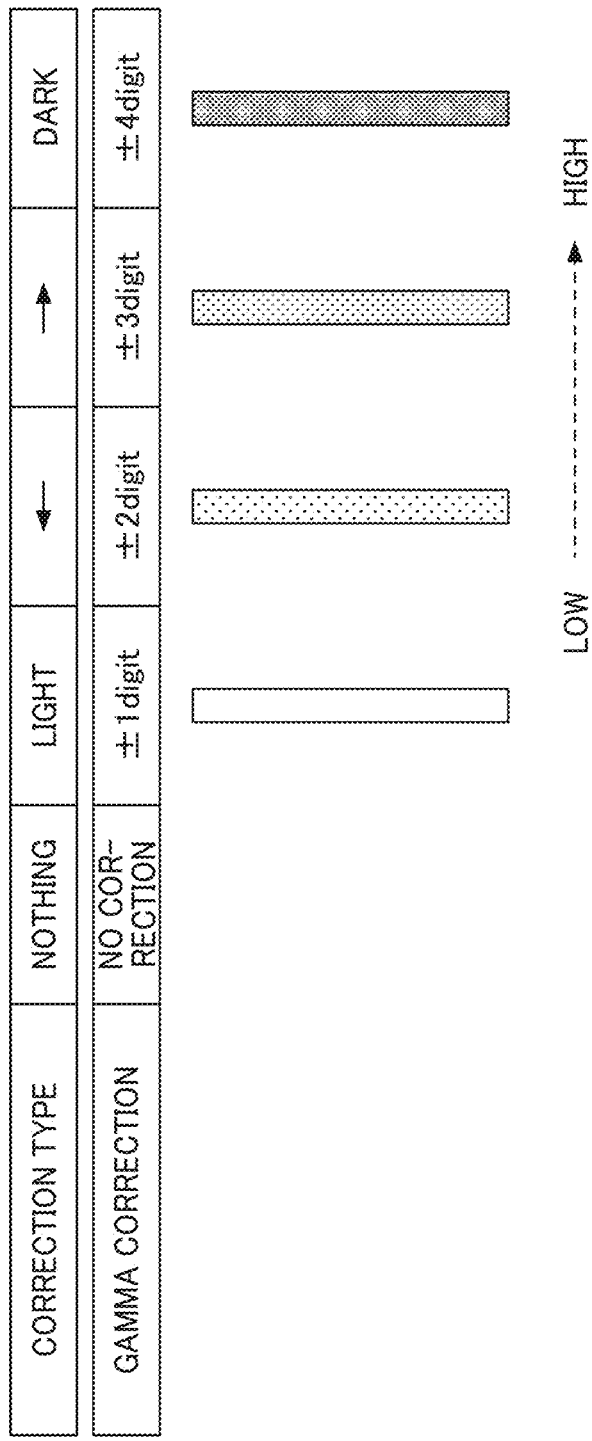
FIG. 11 is a diagram illustrating a method of displaying the correction amount.

FIG. 11 is a diagram illustrating a method of displaying the correction amount.

For example, when the correction amount is zero (0), i. e., no correction is performed, the bar 1006 is not displayed, and the correction amount is displayed in a darker color as the absolute value increases regardless of whether the correction amount is positive or negative. The color density is changed, for example, for one digit of each correction amount of the gamma correction. Note that, although gamma correction is adopted here, when the gradation correction unit 12 performs the correction to adjust a look up table (LUT, which is based on luminance conversion curve), a value ($\Delta E$) determined as a correction amount may be used.

Figure 12:
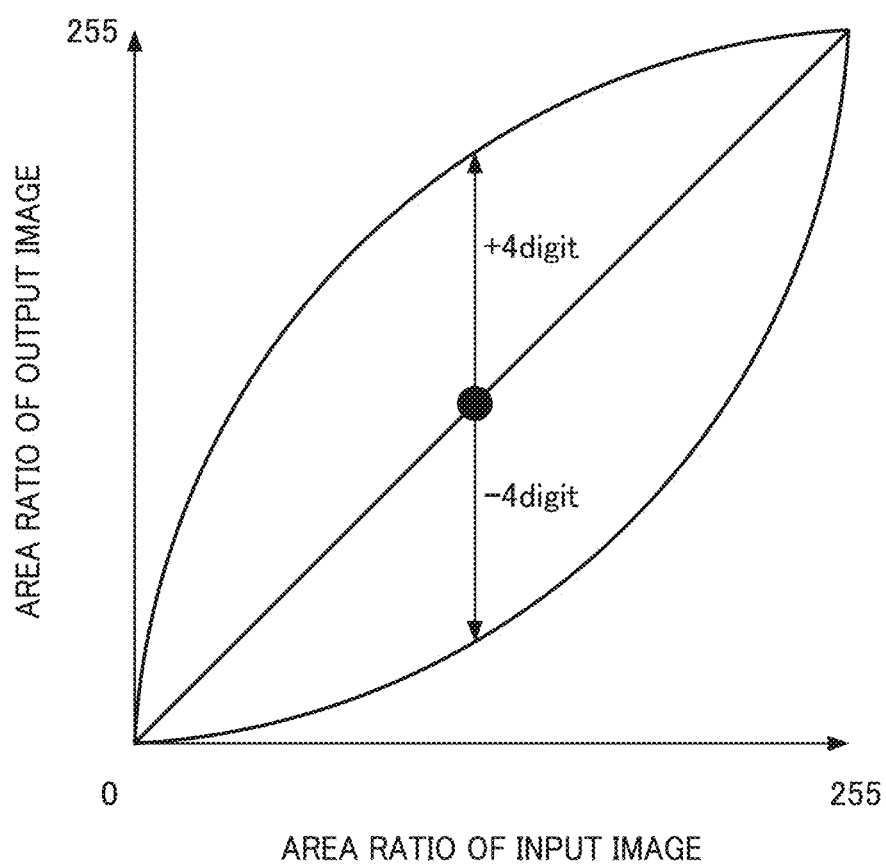
FIG. 12 is a diagram illustrating a method of calculating the correction amount.

FIG. 12 is a graph of a method of calculating the correction amount.

In FIG. 12, the horizontal axis represents the area ratio of the input image (0 to 255 digits), and the vertical axis represents the area ratio of the output image (0 to 255 digits). In the calculation of the correction amount described above, the color stabilization processing unit 14 calculates the correction amount described above based on, for example, a movement amount of a median (black point in FIG. 12) portion from an area ratio in a gamma value before correction to an area ratio in a gamma value after correction.

In the image forming system 1 according to the present embodiment, the color stabilization processing unit 14 performs control to correct the gradation of image data to be printed based on a read image obtained by reading a recording medium by print processing. The display control unit 16 performs control to display information indicating a correction amount of the gradation by the color stabilization processing unit 14. Due to such a configuration, the correction amount of the gradation of the image data in the color stabilization process is displayed. In particular, when the color stabilization function is provided to the user of the image forming system 1 as a chargeable function, the user can grasp whether the color stabilization function is effectively operating based on the displayed correction amount, which is convenient.

Further, the display control unit 16 according to the present embodiment performs control to display a correction amount before applying the correction amount to correction of a gradation of image data. Due to such a configuration, the correction amount is displayed in real time.

Further, the display control unit 16 performs control to display information indicating a color difference between the reference color and the print color associated with the correction amount. Due to such a configuration, the result of the operation of the color stabilization function is displayed. In addition, the display control unit 16 performs control to display the color difference in time series. Due to such a configuration, the result of the operation of the color stabilization function is displayed in chronological order.

In the present embodiment, an example in which color differences are displayed along a time series is described above. However, color differences may be displayed along the number of pages, sheets, or copies in a print job. In this case, the color stabilization processing unit 14 stores information indicating a color difference associated with a page number or a copy number in the print job, which is considered as the color difference information 91, in the storage device 15.

In this case, when the "real time" tab 1001 is selected on the color stabilization function display screen 1000, a selection field for selecting the number of pages, sheets, or copies of a target print job is displayed instead of the target period selection field 1003. When the "period designation" tab 1002 is selected, the fields for designating the start and end of the number of pages, sheets, or copies of the target print job are displayed instead of the period designation field 1004. Then, the horizontal axis of the graph illustrated in FIG. 10 indicates the number of pages, sheets, or copies. Due to such a configuration, the result of the operation of the color stabilization function is displayed along with the number of pages, sheets, or copies of the print job.

Second Embodiment

Hereinafter, descriptions are given of an image processing apparatus 10A according to a second embodiment of the present invention, with reference to the drawings. The configuration of the second embodiment is different from the configuration of the first embodiment in that the image processing apparatus 10A further includes a print stop unit. Thus, in the following description of the second embodiment, differences from the first embodiment are mainly described. The components of the second embodiment having the same functional configurations as the components of the first embodiment are denoted by the same reference numerals used in the description of the first embodiment, and descriptions of the components similar to the first embodiment are omitted in the second embodiment.

Figure 13:
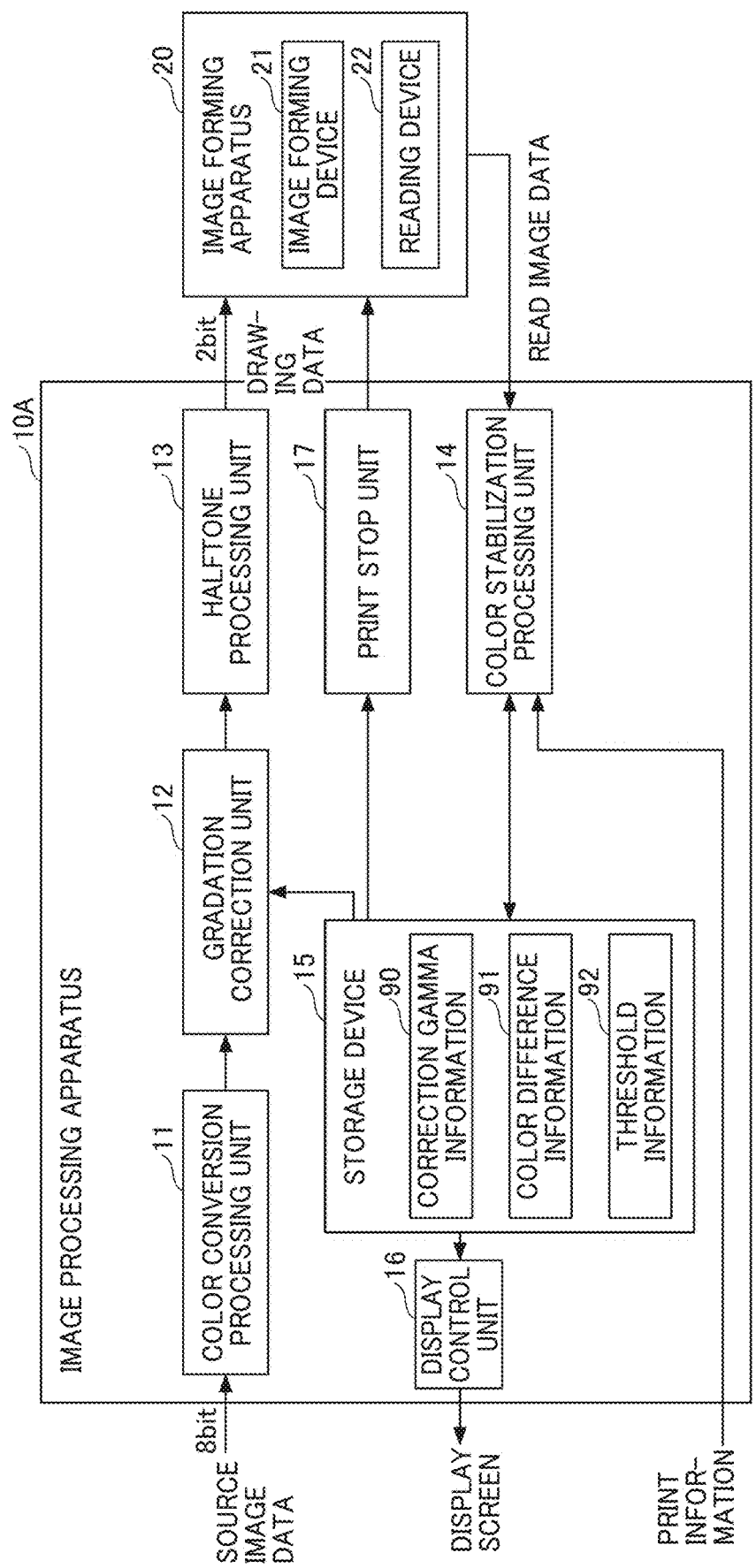
FIG. 13 is a diagram illustrating functions of an image processing apparatus according to a second embodiment.

FIG. 13 is a diagram illustrating functions of the image processing apparatus according to the second embodiment.

The image processing apparatus 10A according to the second embodiment has a configuration in which a print stop unit 17 is added to the image processing apparatus 10 according to the first embodiment.

The print stop unit 17 determines whether to stop printing based on the color difference calculated by the color stabilization processing unit 14 and transmits an instruction to stop the print job based on the determination result, to the image forming apparatus 20.

The storage device 15 stores a threshold information 92 in addition to the correction gamma information 90 and the color difference information 91.

The threshold information 92 is information indicating a threshold set in advance. The threshold is a threshold determined by an operation on the setting screen displayed on the user terminal 30, and the threshold is a value used as a reference for determining whether the print stop unit 17 stops printing.

Figure 14:
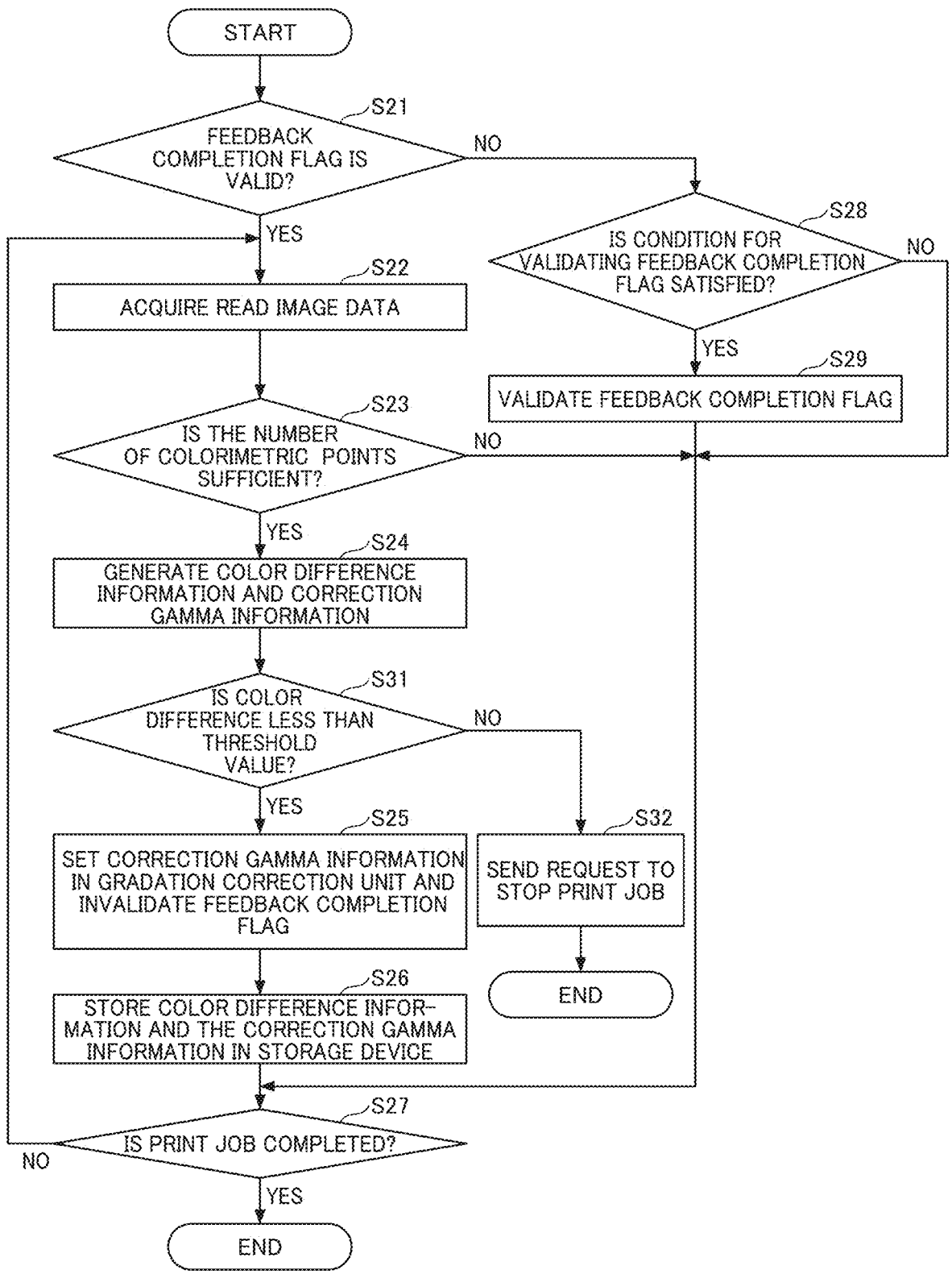
FIG. 14 is a flowchart of color stabilization processing according to the second embodiment.

FIG. 14 is a flowchart of the color stabilization processing according to the second embodiment.

In step S31, in the color stabilization processing according to the present embodiment, following the processing in step S24 of the color stabilization processing according to the first embodiment, the color stabilization processing unit 14 determines whether the color difference is less than the threshold. When the color stabilization processing unit 14 determines that the color difference is less than the threshold (YES in step S31), the color stabilization processing unit 14 performs the process of step S25. The subsequent processes are the same as the color stabilization process according to the first embodiment. When the color stabilization processing unit 14 determines that the color difference is not less than the threshold (NO in step S31), the print stop unit 17 transmits an instruction to stop the print job to the image forming apparatus 20 in step S32 and ends the color stabilization processing.

Figure 15:
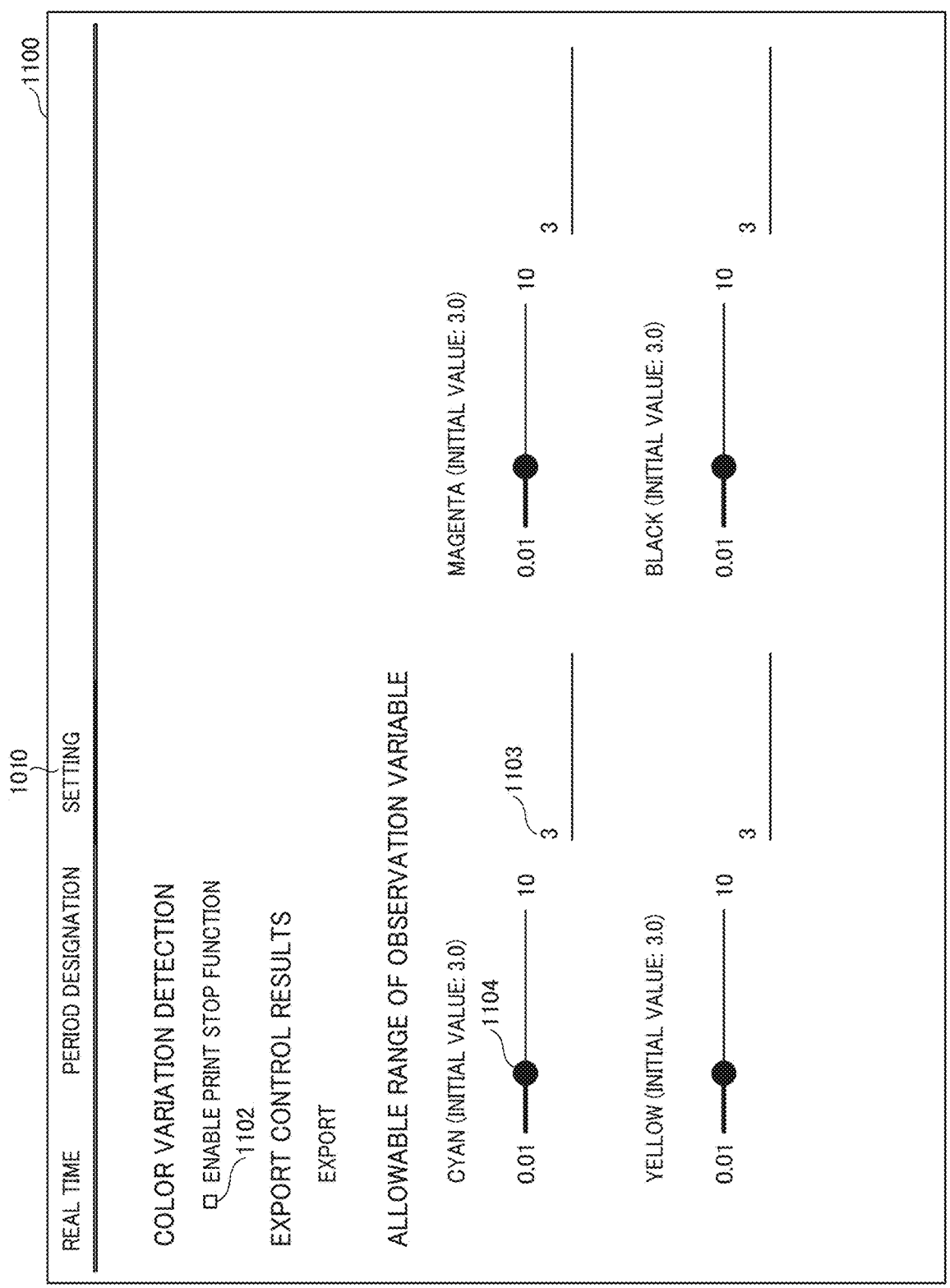
FIG. 15 is a diagram illustrating a setting screen according to the second embodiment.

FIG. 15 is a diagram illustrating a setting screen according to the second embodiment. The setting screen 1100 is displayed when the "setting" tab 1010 is selected and includes a check box 1102 to enable a print stop function, a threshold input field 1103, and a threshold designation bar 1104.

The check box 1102 is a check box for selecting whether to enable the function of the print stop unit 17. The threshold input field 1103 and the threshold designation bar 1104 are displayed in conjunction with each other such that one of the threshold input field 1103 and the threshold designation bar 1104 is changed in response to the change of the other, and the user set one of the threshold input field 1103 and the threshold designation bar 1104.

The threshold is set for each color of CMYK. In the determination in step S31 of FIG. 14, the color stabilization processing unit 14 determines whether the color difference of each color of CMYK is less than the threshold set for each color of CMYK. When the color difference of any one of CMYK is not less than the threshold, the color stabilization processing unit 14 determines that the color difference is not less than the threshold. That is, the printing is continued under the condition that each of the colors of CMYK is less than the threshold.

Figure 16:
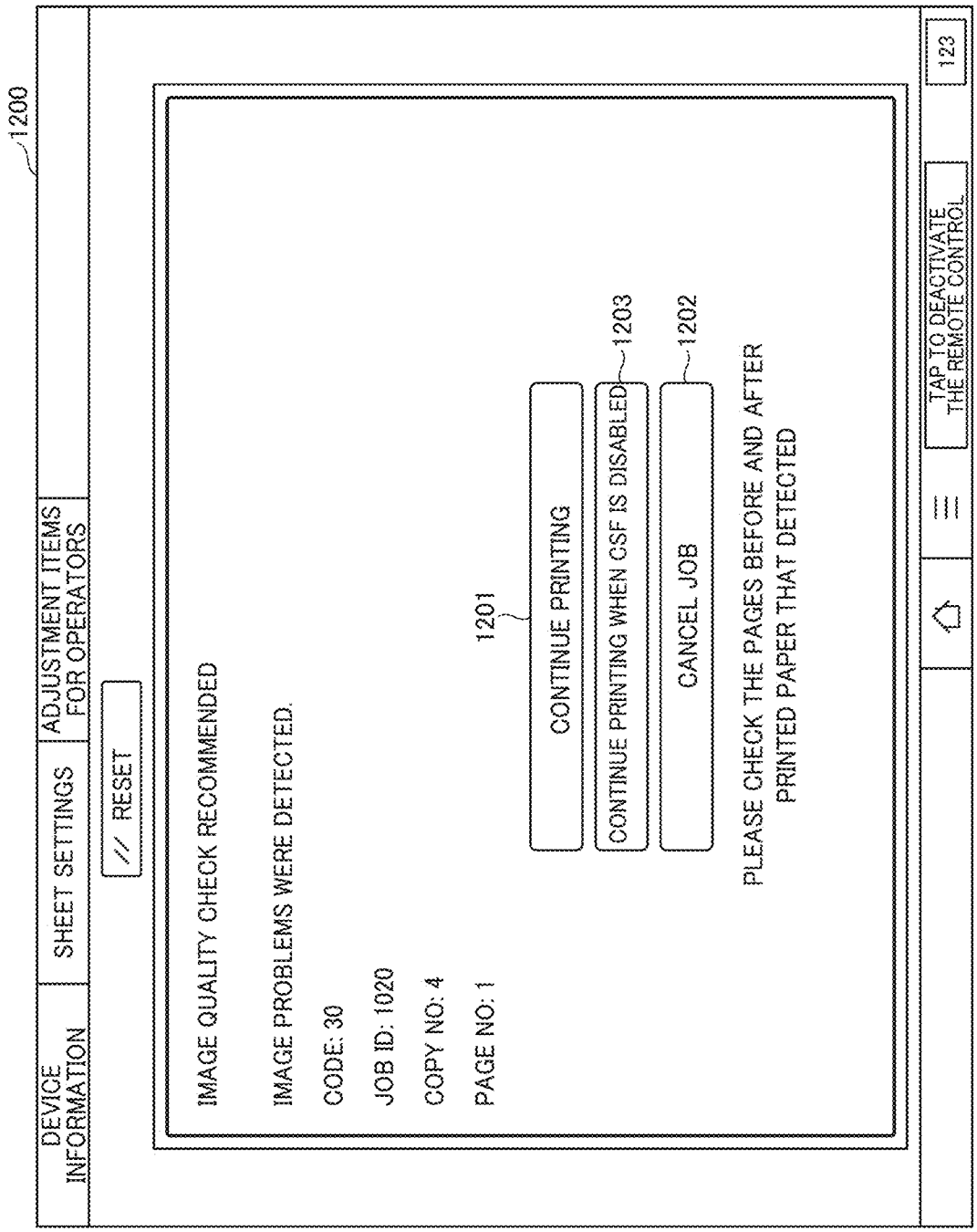
FIG. 16 is a diagram illustrating an operation panel screen according to the second embodiment.

FIG. 16 is a diagram illustrating an operation panel screen according to the second embodiment.

The image forming apparatus 20 temporarily stops the print job and displays an operation panel screen 1200 illustrated in FIG. 16 in response to receipt of the print stop instruction from the print stop unit 17. The operation panel screen 1200 includes a print continuation button 1201, a print cancel button 1202, and a color stabilization function stop button 1203.

When the print continuation button 1201 is pressed, the image forming apparatus 20 resumes the print job that has been temporarily stopped. When the print cancel button 1202 is pressed, the image forming apparatus 20 cancels the print job that has been temporarily stopped. When the color stabilization function stop button 1203 is pressed, printing is continued but a color stabilization function (CSF) remains stopped. The operation panel screen 1200 displays information indicating the job ID, the number of copies, and the number of pages at the time of stopping.

Figure 17:
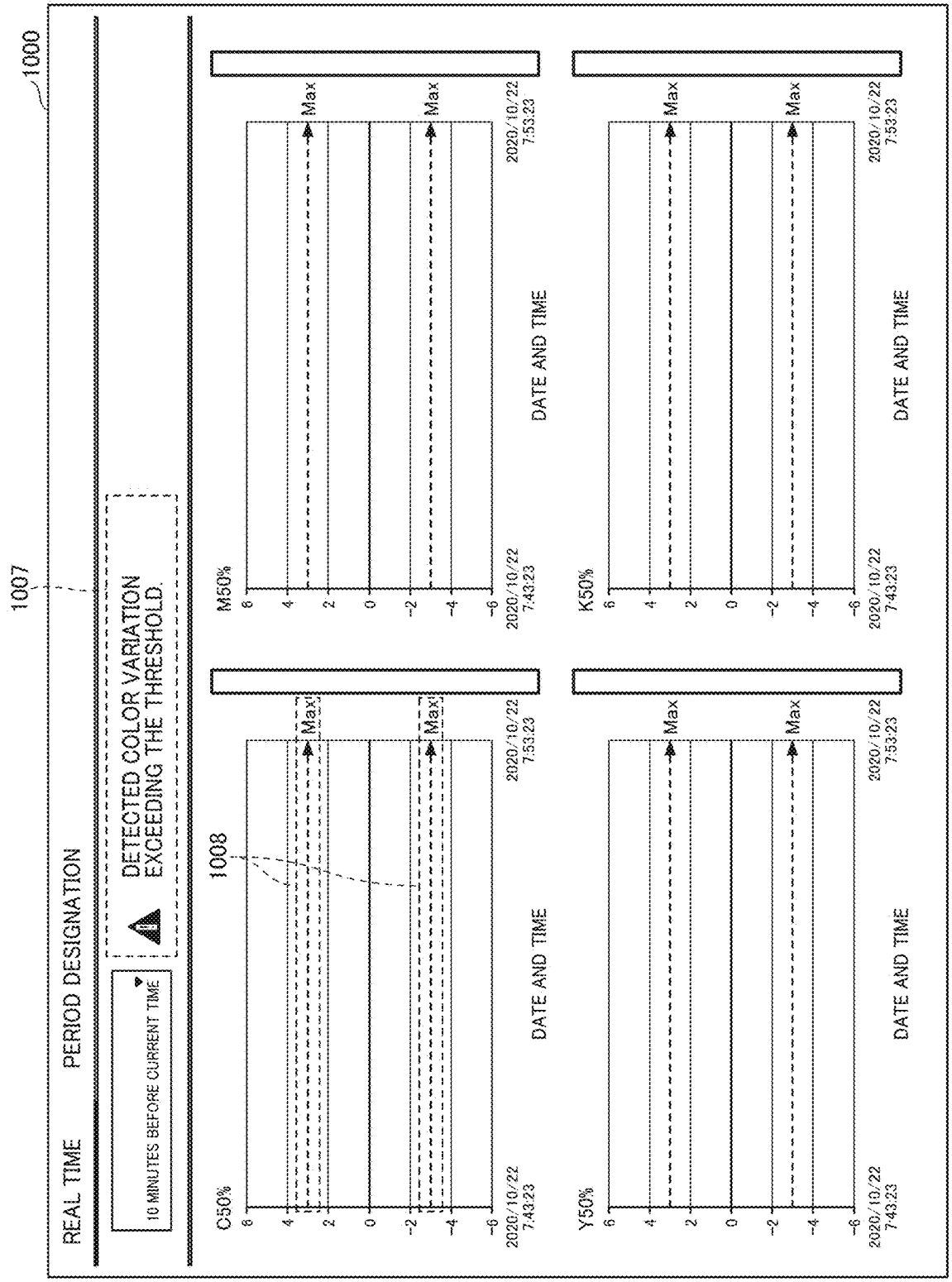
FIG. 17 is a diagram illustrating a display screen of a color stabilization function according to the second embodiment.

FIG. 17 is a diagram illustrating a display screen of the color stabilization function according to the second embodiment.

The color stabilization function display screen 1000 according to the present embodiment includes a color variation detection message 1007 and a threshold display 1008.

When the color stabilization processing unit 14 determines, in step S31 of the flowchart illustrated in FIG. 14, that the color difference is not less than the threshold, the display control unit 16 transmits information indicating that a color variation has been detected, to the user terminal 30. Then, the color variation detection message 1007 is displayed to indicate a message that a color difference exceeding the threshold has occurred on the color stabilization function display screen 1000.

A threshold display 1008 displays the thresholds set on the setting screen 1100 on a graph for each color of CMYK. The threshold display 1008 is displayed along with the plot 1005 and the bar 1006 illustrated in FIG. 10.

According to the image forming system 1 of the present embodiment, the print stop unit 17 performs control to stop printing when the color difference between the print color and the reference color is greater than or equal to a predetermined threshold. Due to such a configuration, continuing printing that is highly likely to deviate from the target color is avoided and reduce printing costs.

Third Embodiment

Hereinafter, descriptions are given of an image forming system according to a third embodiment, with reference to the drawings. The configuration of the third embodiment is different from the configuration of the first embodiment in that the control status of the color stabilization function is displayed. That is, in the configuration of the third embodiment, the display control unit 16 is configured to display control status of the color stabilization processing unit 14. Thus, in the following description of the third embodiment, differences from the first embodiment are mainly described. The components having the same functional configurations as the first embodiment is denoted by the same reference numerals used in the description of the first embodiment, and descriptions of the components similar to the first embodiment are omitted in the third embodiment.

Figure 18:
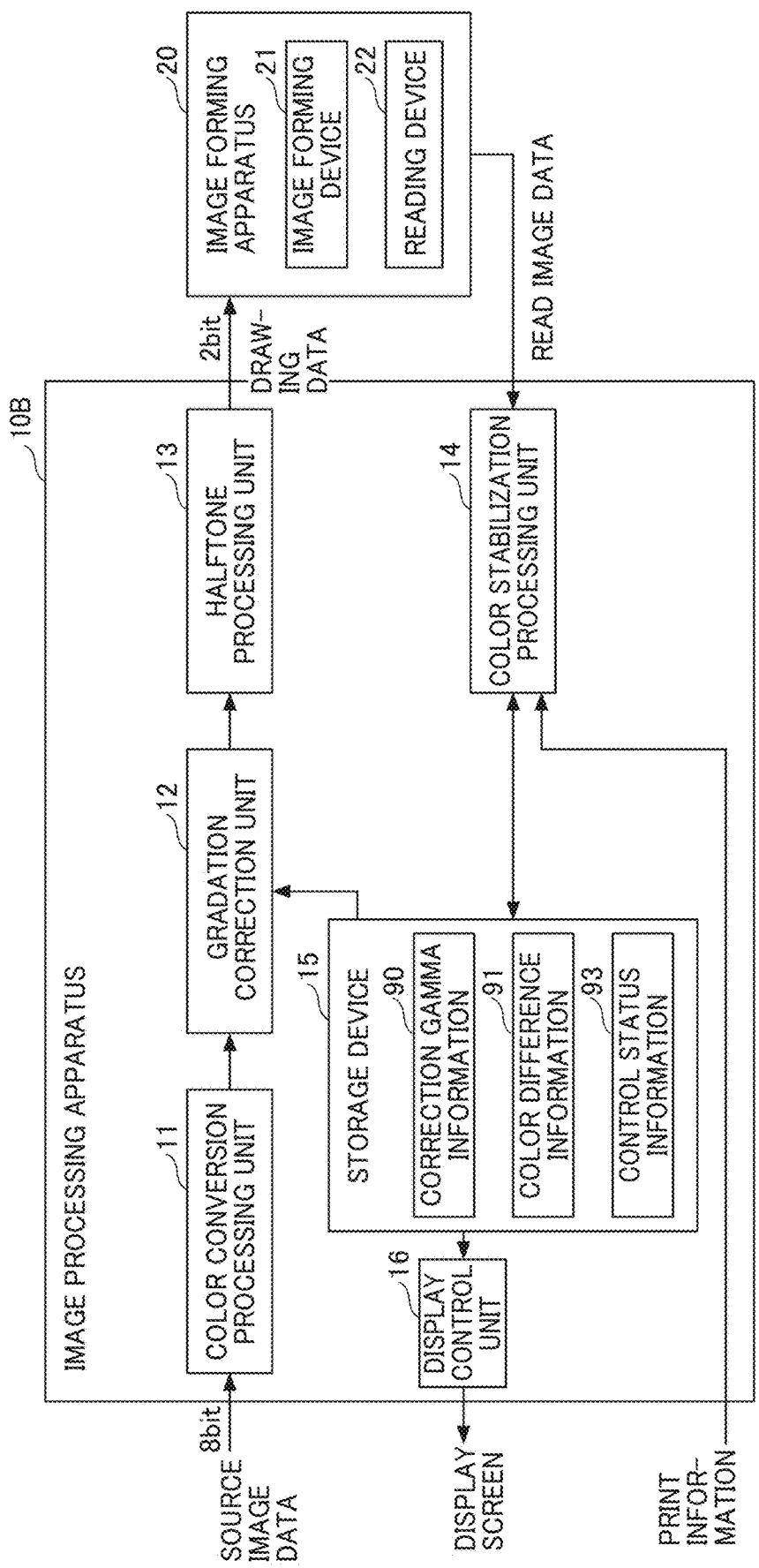
FIG. 18 is a diagram illustrating functions of an image processing apparatus according to a third embodiment.

FIG. 18 is a diagram illustrating functions of an image processing apparatus according to the third embodiment.

In an image processing apparatus 10B according to the present embodiment, a control status information 93 is stored in the storage device 15 in addition to the correction gamma information 90 and the color difference information 91 according to the first embodiment. The control status information 93 is information indicating a control status of the color stabilization process. The control status is, for example, either a value during control or a value during stop. Specifically, the color stabilization process is stopped in the following status, and the control status information 93 has a status indicating that the color stabilization process is stopped. The following status is: printing is stopped; sheet property information (information indicating properties of printing sheet) is not created; the profile information at the time when the sheet property information is created is different from at the time of printing; the printing is a monochrome printing; image data having no colorimetric region (for example, a solid region or a line drawing alone); or abnormality has occurred in the color stabilization processing unit 14.

In a status other than the above-described statuses, the status of the color stabilization process is during control, and the control status information 93 has a value indicating the status of during control.

Figure 19:
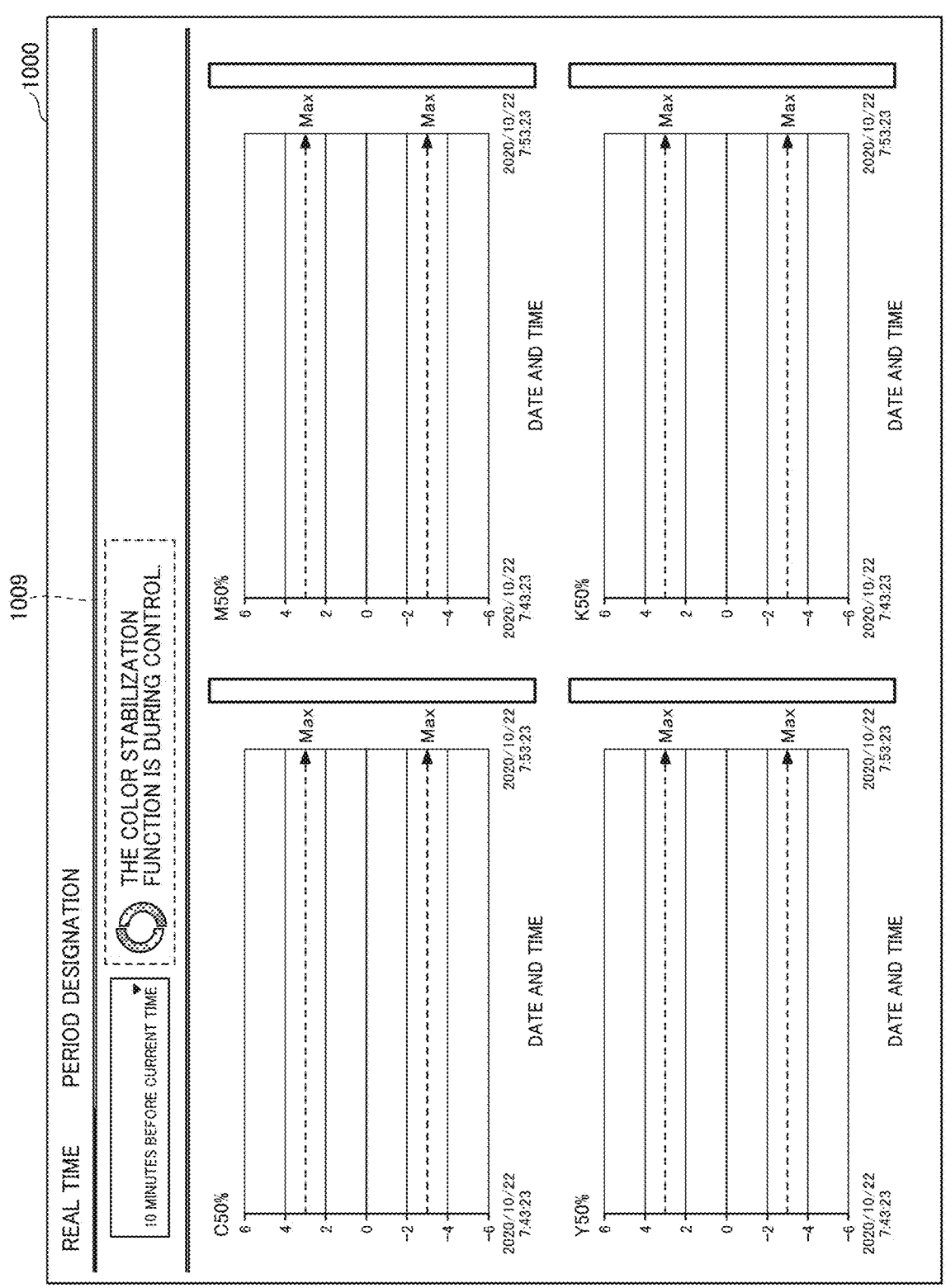
FIG. 19 is a diagram illustrating a display screen of the color stabilization function according to the third embodiment.

FIG. 19 is a diagram illustrating a display screen of the color stabilization function according to the third embodiment.

The color stabilization function display screen 1000 according to the present embodiment includes a control status display 1009. The display control unit 16 transmits, screen data including an image and a message indicating whether the color stabilization function is being controlled or stopped, as the control status display 1009, to the user terminal 30. In the image forming system 1 according to the present embodiment, the display control unit 16 performs control to display the control status of the color stabilization processing unit 14. Due to such a configuration, the control status of the color stabilization function is displayed. Then, the user confirms whether the color stabilization function is being executed. If the color stabilization function is being stopped, the user takes an action to eliminate the inconvenience.

In each of the embodiments described above, the image processing apparatus 10 and the image forming apparatus 20 are configured to share the above-described processing steps in various combinations. Further, the elements of the image processing apparatus 10 and the image forming apparatus 20 may be integrated into one apparatus or may be separately disposed in a plurality of different apparatuses.

In an embodiment, the image processing apparatus 10 may be configured as an information processing system including a plurality of computing devices such as a server cluster. The plurality of computing devices is configured to communicate with one another via any type of communication link, including a network or shared memory to implement the processing described in the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. The elements of the above-described embodiments can be modified without departing from the gist of the present disclosure, and can be appropriately determined according to the application form. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

This patent application is based on and claims priority to Japanese Patent Application No. 2021-008701, filed on Jan. 22, 2021, in the Japan Patent Office, the entire disclosure of which is hereby incorporated by reference herein.

REFERENCE SIGNS LIST

1: image forming system
10: image processing apparatus
11: color conversion processing unit
12: gradation correction unit
13: halftone processing unit
14: color stabilization processing unit
15: storage device
16: display control unit
17: print stop unit
20: image forming apparatus
30: user terminal
40: management server

The invention claimed is:
1. An image processing apparatus comprising:
processing circuitry configured to,
determine a gamma correction amount of gradation of image data in a print job to be subsequently printed based on a read image obtained by reading sheets that are equal to or less than a desired number of sheets as a print processing result of the print job;
generate color difference information and correction gamma information based on the read image, the color difference information indicating a color difference between a print color and a reference color, the correction gamma information indicating the gamma correction amount;
set the color difference information and the correction gamma information such that the color difference information and the correction gamma information are applied to a correction of a gradation of the image data to be printed for another desired number of sheets; and
display at least one display component which indicates the gamma correction amount while the print job is being processed, and changes in accordance with a magnitude of the gamma correction amount.

2. The image processing apparatus according to claim 1, wherein the processing circuitry is further configured to:
in response to a determination of the gamma correction amount, display the gamma correction amount before an application of the gamma correction amount to the gradation correction of the image data.

3. The image processing apparatus according to claim 1, wherein the processing circuitry is further configured to:
display the gamma correction amount in response to an application of the gamma correction amount to the gradation correction of the image data.

4. The image processing apparatus according to claim 1, wherein the processing circuitry is further configured to:
display color difference information in association with the gamma correction amount.

5. The image processing apparatus according to claim 4, wherein the processing circuitry is further configured to display the color difference information by:
displaying the color difference between the print color and the reference color for each of a plurality of color materials; and
displaying a display component indicating the gamma correction amount for each of the plurality of color materials.

6. The image processing apparatus according to claim 4, wherein the processing circuitry is further configured to display the color difference information by:
displaying the color difference between the print color and the reference color in chronological order, or in accordance with at least one of a number of pages, sheets, copies of a print job, or any combinations thereof.

7. The image processing apparatus according to claim 1, further comprising:
a memory; and
the processing circuitry is further configured to,
correct a gradation of the image data to be printed, and
store the color difference information and the correction gamma information in the memory in a displayable format.

8. The image processing apparatus according to claim 1, wherein the processing circuitry is further configured to:
stop printing when the color difference between the print color and the reference color is equal to or greater than a desired threshold.

9. The image processing apparatus according to claim 1, wherein the processing circuitry is further configured to:
display a control status of a color stabilization process.

10. An image forming system comprising:
an image forming device configured to form an image on a recording medium;
a reading device configured to read the recording medium on which the image is formed by the image forming device; and
processing circuitry configured to,
determine a gamma correction amount of gradation of image data to be printed based on a read image obtained by reading sheets that are equal to or less than a desired number of sheets as a print processing result, generate color difference information and correction gamma information based on the read image, the color difference information indicating a color difference between a print color and a reference color, the correction gamma information indicating the gamma correction amount, set the color difference information and the correction gamma information such that the color difference information and the correction gamma information are applied to a correction of the gradation of the image data to be printed for another desired number of sheets, and display at least one display component which indicates the gamma correction amount and changes in accordance with a magnitude of the gamma correction amount.

11. An image processing method to be performed by a computer, the image processing method comprising:

determining a gamma correction amount of gradation of image data to be printed based on a read image obtained by reading sheets that are equal to or less than a desired number of sheets as a print processing result;

generating color difference information and correction gamma information based on the read image, the color difference information indicating a color difference between a print color and a reference color, the correction gamma information indicating the gamma correction amount;

setting the color difference information and the correction gamma information such that the color difference information and the correction gamma information are applied to a correction of the gradation of the image data to be printed for another desired number of sheets; and displaying at least one display component which indicates the gamma correction amount and changes in accordance with a magnitude of the gamma correction amount.

12. A non-transitory computer readable storage medium storing computer-readable program code which, when executed by a computer, causes the computer to execute the method of claim 11.

13. The image forming system according to claim 10, wherein the processing circuitry is further configured to:

in response to the determination of the gamma correction amount, display the gamma correction amount before the application of the gamma correction amount to the gradation correction of the image data.

14. The image forming system according to claim 10, wherein the processing circuitry is further configured to:

display the gamma correction amount in response to the application of the gamma correction amount to the gradation correction of the image data.

15. The image forming system according to claim 10, wherein the processing circuitry is further configured to:

display the color difference information in association with the gamma correction amount.

16. The image forming system according to claim 15, wherein the processing circuitry is further configured to display the color difference information by:

displaying the color difference between the print color and the reference color for each of a plurality of color materials; and displaying a display component indicating the gamma correction amount for each of the plurality of color materials.

17. The image forming system according to claim 15, wherein the processing circuitry is further configured to display the color difference information by:

display the color difference between the print color and the reference color in chronological order, or in accordance with at least one of a number of pages, sheets, copies of a print job, or any combinations thereof.

18. The image forming system according to claim 10, further comprising:

a memory; and the processing circuitry is further configured to, correct a gradation of the image data to be printed, and store the color difference information and the correction gamma information in the memory in a displayable format.

19. The image processing method according to claim 11, further comprising:

in response to the determining the gamma correction amount, displaying the gamma correction amount before the application of the gamma correction amount to the gradation correction of the image data.

20. The image processing method according to claim 11, further comprising:

correcting a gradation of the image data to be printed; and storing the color difference information and the correction gamma information in memory of the computer in a displayable format.

* * * * *